United States Patent
Petersson et al.

(10) Patent No.: US 10,644,396 B2
(45) Date of Patent: May 5, 2020

(54) ANTENNA STRUCTURE FOR BEAMFORMING

(71) Applicant: Telefonaktiebolaget LM Ericsson (publ), Stockholm (SE)

(72) Inventors: Sven Petersson, Sävedalen (SE); Fredrik Athley, Kullavik (SE); Martin Johansson, Mölndal (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 204 days.

(21) Appl. No.: 15/515,327

(22) PCT Filed: Feb. 27, 2017

(86) PCT No.: PCT/EP2017/054462
§ 371 (c)(1),
(2) Date: Mar. 29, 2017

(87) PCT Pub. No.: WO2018/153492
PCT Pub. Date: Aug. 30, 2018

(65) Prior Publication Data
US 2018/0248263 A1    Aug. 30, 2018

(51) Int. Cl.
*H01Q 3/26*    (2006.01)
*H04B 7/0413*    (2017.01)
(Continued)

(52) U.S. Cl.
CPC .............. *H01Q 3/2682* (2013.01); *H01Q 3/26* (2013.01); *H01Q 5/42* (2015.01); *H01Q 21/065* (2013.01);
(Continued)

(58) Field of Classification Search
CPC ........... H01Q 5/42; H01Q 3/2682; H01Q 3/26
See application file for complete search history.

(56) References Cited

U.S. PATENT DOCUMENTS 3,358,287 A * 12/1967 Brueckmann ...... H01Q 13/0241
343/786
2010/0227646 A1    9/2010 Ogawa et al.
(Continued)

FOREIGN PATENT DOCUMENTS

WO    2016173633 A1    11/2016

OTHER PUBLICATIONS

"Arrays: Linear, Planar and Circular," Antenna Theory Analysis and Design, 3rd Edition, Constantine Balanis 2005, pp. 283 to 371.*
(Continued)

*Primary Examiner* — Graham P Smith
(74) *Attorney, Agent, or Firm* — Rothwell, Figg, Ernst & Manbeck, P.C.

(57) ABSTRACT

An antenna structure (10, 20) for beamforming is disclosed. The antenna structure (10, 20) comprises: a first set of antenna elements (12a, 12b; 21a, 21b, 21c, 21d, 21e, 21f) connected by a first analog distribution network (14a; 24a) to a first baseband chain (11a; 23a), and a second set of antenna elements (13a, 13b; 22a, 22b, 22c, 22d, 22e, 22f) connected by a second analog distribution network (14b; 24b) to a second baseband chain (11b; 23b), wherein the first set of antenna elements (12a, 12b; 21a, 21b, 21c, 21d, 21e, 21f) are arranged interleaved with the second set of antenna elements (13a, 13b; 22a, 22b, 22c, 22d, 22e, 22f) and wherein the antenna elements of the first and second sets are designed for use on same carrier frequency.

11 Claims, 3 Drawing Sheets

(51) Int. Cl.
*H04B 7/06* (2006.01)
*H01Q 5/42* (2015.01)
*H01Q 21/06* (2006.01)
*H01Q 21/24* (2006.01)
*H04B 7/0426* (2017.01)

(52) U.S. Cl.
CPC ......... *H01Q 21/245* (2013.01); *H04B 7/0413* (2013.01); *H04B 7/0617* (2013.01); *H04B 7/043* (2013.01)

(56) References Cited

U.S. PATENT DOCUMENTS

| | | |
|---|---|---|
| 2012/0319900 A1 | 12/2012 | Johansson et al. |
| 2014/0050280 A1 | 2/2014 | Stirling-Gallacher et al. |
| 2015/0318622 A1* | 11/2015 | Pruett ................. H01Q 21/061 343/876 |
| 2016/0219567 A1 | 7/2016 | Gil et al. |
| 2016/0365900 A1 | 12/2016 | Kim et al. |

OTHER PUBLICATIONS

International Search Report and Written Opinion issued in International Application No. PCT/EP2017/054462, dated Nov. 10, 2017, 17 pages.

\* cited by examiner

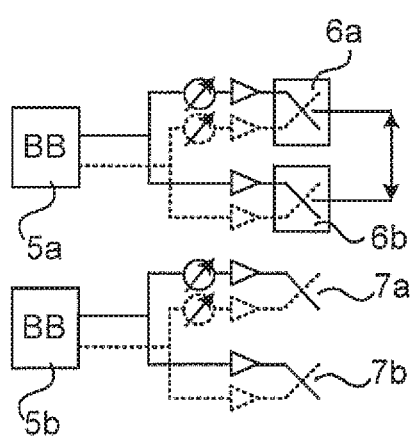
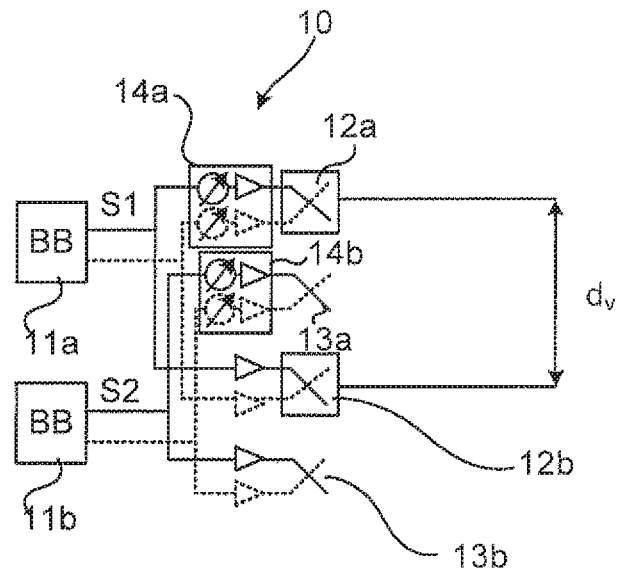
Fig. 5a
Fig. 5b
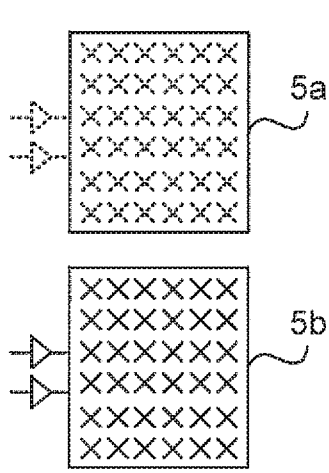
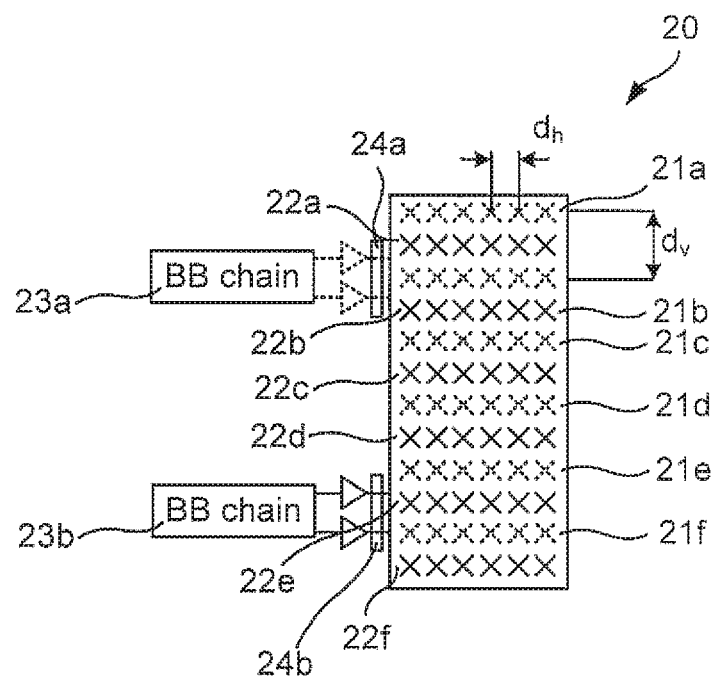
Fig. 6a
Fig. 6b

ANTENNA STRUCTURE FOR BEAMFORMING

CROSS-REFERENCE TO RELATED APPLICATION(S)

This application is a 35 U.S.C. § 371 National Stage of International Patent Application No. PCT/EP2017/054462, filed Feb. 27, 2017, designating the United States.

TECHNICAL FIELD

The technology disclosed herein relates generally to the field of wireless communication, and in particular to an antenna structure for use in wireless communication.

BACKGROUND

A large variety of requirements for the next generation of mobile communications system (5G) implies that frequency bands at many different carrier frequencies will be needed. For example, low bands will be needed for achieving sufficient coverage and higher bands (e.g. mmW, i.e. near and above 30 GHz) will be needed for reaching to the required capacity. At high frequencies the propagation properties are more challenging and beamforming both at the transmission/reception point (TRP) and at a communication device (exemplified by user equipment, UE, in the following) might be required to reach sufficient link budget.

5G faces many challenges and research is made within various areas. One overall goal is, as indicated above, to increase capacity, e.g. since the number of users and also types of services increase, wherein some services require much of the system capacity.

SUMMARY

An objective of the present disclosure is to address the above-mentioned increases in user and service types in wireless communication systems. A particular objective is to provide an antenna architecture for use in meeting the need for increased capacity. This objective and others are achieved by antenna structure and use thereof according to the appended independent claims, and by the embodiments according to the dependent claims.

The objective is according to an aspect achieved by an antenna structure for beamforming. The antenna structure comprises a first set of antenna elements connected by a first analog distribution network to a first baseband chain and a second set of antenna elements connected by a second analog distribution network to a second baseband chain. The first set of antenna elements are arranged interleaved with the second set of antenna elements and the antenna elements of the first and second sets are designed for use on same carrier frequency.

The antenna structure provides several advantages. For instance, by this design of the antenna structure, the element separation can be increased without increasing the antenna aperture, i.e. without increasing the size of the antenna structure, and an increase in capacity for a given antenna size is enabled. Further, the design enables improvement for user-specific beamforming.

Further features and advantages of the embodiments of the present teachings will become clear upon reading the following description and the accompanying drawings.

BRIEF DESCRIPTION OF THE DRAWINGS

FIGS. 5a and 5b illustrate a prior art solution and an embodiment of an antenna structure in accordance with the present teachings, respectively.

FIGS. 6a and 6b illustrate a prior art solution and an embodiment of an antenna structure in accordance with the present teachings, respectively.

DETAILED DESCRIPTION

Figure 1:
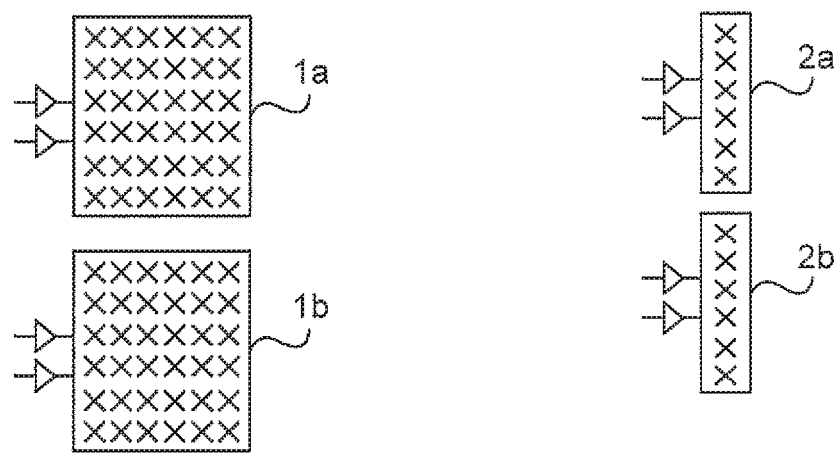
FIG. 1 illustrates different antenna array panels.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

With a goal of finding ways to meet the capacity demand, some research has been made by the present inventors. In particular, beamforming and related issues such as antenna panels, in particular design and performance thereof, were studied.

There are basically three different implementations of beamforming, both at a transmission/reception point (TRP) and at the UE: analog beamforming, digital beamforming and hybrid beamforming. Each implementation has its advantages and disadvantages. Digital beamforming is the most flexible solution but also the most expensive since a large number of radios and baseband chains is required. Analog beamforming is the least flexible but cheaper than the digital beamforming, e.g. in view of manufacturing costs owing to a reduced number of required radio and baseband chains. Hybrid beamforming is a compromise between the analog and digital beamforming. One type of hybrid beamforming antenna architecture that has been agreed to be studied in $3^{rd}$ Generation Partnership Project (3GPP) for the New Radio (NR) access technology in 5G, is the concept of antenna panels.

FIG. 1 illustrates two exemplary antenna structures with two antenna panels 1a, 1b; 2a, 2b each. The left-most antenna panels 1a, 1b are two-dimensional panels, while the right-most antenna panels 2a, 2b are one-dimensional panels. An antenna panel is a rectangular antenna array of dual-polarized elements with typically one transmit/receive unit (TXRU) per polarization, that is, each antenna panel 1a, 1b; 2a, 2b is connected to one TXRU per polarization. An analog distribution network with phase shifters is used to steer the beam of each panel 1a, 1b; 2a, 2b. Multiple antenna panels can be stacked next to each other and digital beamforming can be performed across the panels.

Figure 2:
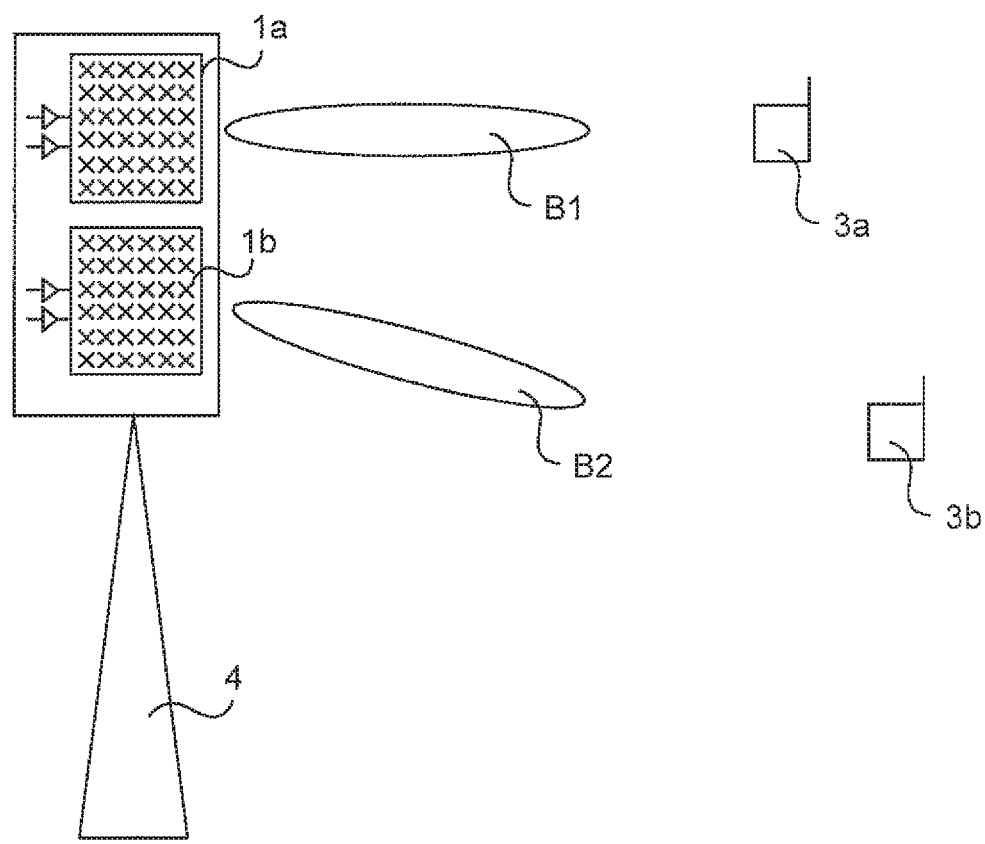
FIG. 2 illustrates a scenario wherein different antenna array panels serve different users.

FIG. 2 illustrates a scenario wherein different antenna array panels serve different users. One expected feature for NR is Multi-User Multiple-Input and Multiple-Output (MU-MIMO). This means that multiple UEs 3a, 3b can be served simultaneously from one TRP 4, e.g. a radio access point such as a base station, eNB or gNB. In case of, for instance, hybrid beamforming is used for a multi-panel antenna architecture (e.g. as shown in FIGS. 1 and 2), each antenna panel will typically be used to generate a narrow beam B1, B2 for a respective UE 3a, 3b. In this case there will be no digital precoding over the multiple antenna panels 1a, 1b.

However, if only one UE is served at a time, then precoding can be applied over multiple panels.

For antenna array structures having multiple panels 1a, 1b; 2a, 2b with analog beamforming within the panels, the elements within each panel 1a, 1b; 2a, 2b is typically located close to each other, in particular a half wavelength, λ/2, apart, in order to reduce grating lobes. Simulation results performed by the inventors of the present invention showed that UE-specific beamforming performance is worse for elements closely spaced in the vertical dimension compared to elements widely spaced in the vertical dimension in some important scenarios.

Briefly, based on the above findings, an antenna structure is provided, wherein elements that belong to different panels are interleaved in the vertical dimension and connected to different baseband chains. This design is made in order to increase the element separation without increasing the antenna aperture. The inventive antenna structure comprises interleaving a first set of elements connected by an analog distribution network to a baseband chain with a second set of elements connected by another analog distribution network to another baseband chain. By this design, an increase in the element separation for the signal transmitted from each baseband chain is obtained, thereby improving the UE-specific beamforming performance for some important scenarios.

The earlier mentioned simulations were performed by the inventors in order to investigate gains with UE-specific beamforming. The simulation results showed that the element separation has a large impact on the system performance.

Figure 3:
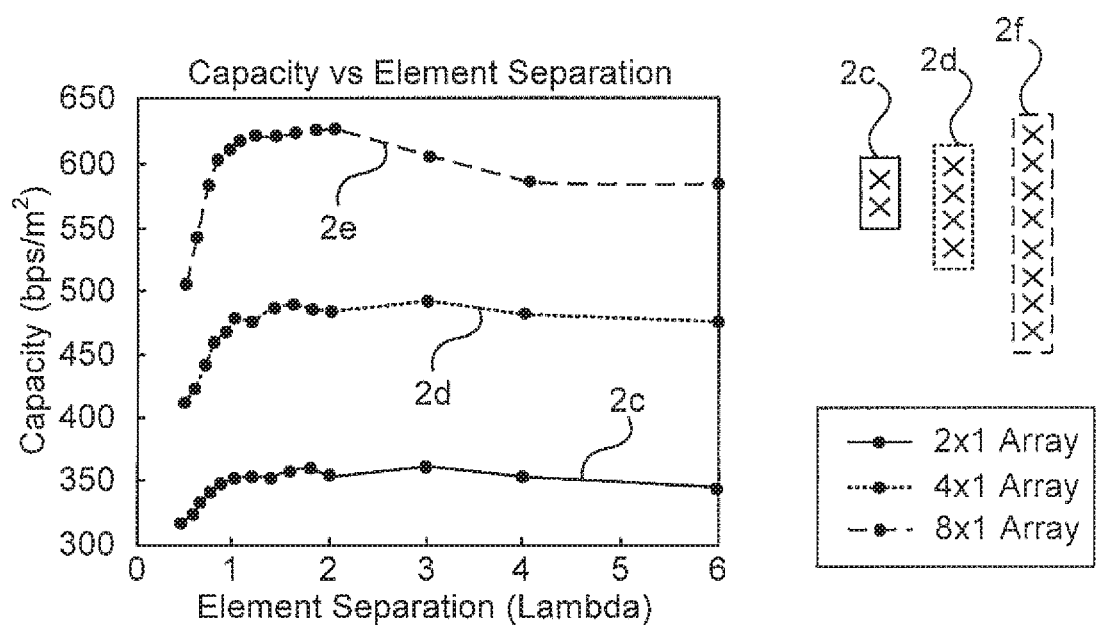
FIG. 3 illustrates graph over capacity versus element separation.

FIG. 3 illustrates graph over capacity versus element separation for three different sizes of one-dimensional vertical antenna panels 2c, 2d, 2e. The graph illustrates how the downlink capacity depends on the element separation for the vertical column arrays 2c, 2d, 2e of sizes 2×1, 4×1 and 8×1, respectively. The simulations were performed for an urban flat scenario, and in the simulations cell reference signals (CRSs) were transmitted on the element patterns, which are used to define the cell coverage. As can be seen in the FIG. 3, relatively large element separations (1-2λ) give much better performance than an element separation of around 0.5, which is conventionally used in an array intended for UE-specific beamforming. For example, when going from an eight element array 2e with 0.5 element separation to a four element array 2d with 1λ separation (black arrow in the figure) the system capacity only reduces from about 505 bps/m² to about 480 bps/m². This corresponds to a capacity loss of about 5%. This means that every second element in the eight element array 2e could be removed without any significant loss in performance. According to an embodiment of the present teachings, every second element in e.g. the eight element array 2e is connected to a different baseband chain and via a different analog distribution networks than the remaining four elements.

A reason that larger element separations give better performance than smaller element separations for elevation UE-specific beamforming is that the larger element separation is, the narrower the UE-specific beam is obtained. The narrower the UE-specific beam is, the less power will interfere with other UEs. Of course for the large element separations a grating lobe will also occur which will generate interference, however, for elevation beamforming this grating lobe typically ends up towards the sky and hence does not generate any interference towards other users. Similar results were obtained regardless of the number of elements in the arrays.

Figure 4:
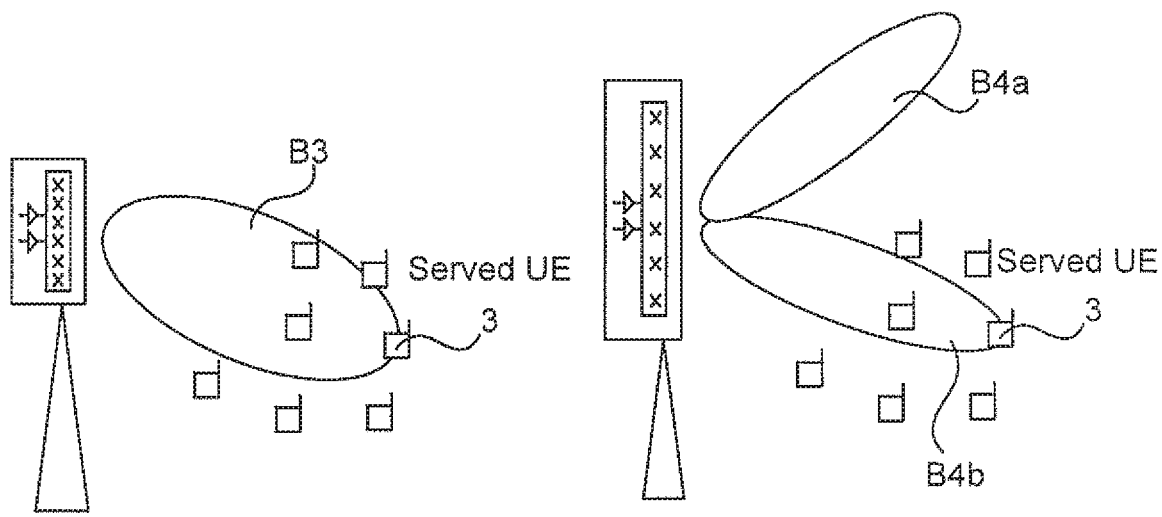
FIG. 4 illustrates how SINR depends on beamforming.

FIG. 4 describes the above mentioned phenomena. In the FIG. 4, a first scenario is shown at left-hand side and a second scenario is shown at the right-hand side. In the first scenario a narrow (0.5λ) element separation in the vertical dimension is used, and in the second scenario, a large (1λ) element separation in the vertical dimension is used. The received power of the served UE 3 will be similar in both cases, however, as can be seen by the respective beams B3 and B4a, B4b, the interference generated towards other users is much less in the second scenario. The reason for this is that half of the energy (beam B4a) is transmitted in to the sky, i.e. in a direction where there are no users.

For the horizontal dimension, the study performed by the inventors showed that the best element separation is 0.5λ. The reason for this is that the grating lobes for this case, i.e. horizontal UE-specific beamforming with large horizontal element separation, will end up in neighboring cells and hence generates interference anyway. So, as a conclusion drawn based on the study, it is beneficial to use an element separation of about 0.5λ in the horizontal dimension but a large element separation (e.g. at least 0.8λ) in the vertical dimension in order to maximize the performance for some specific cases, e.g. UE-specific beamforming.

FIG. 5b illustrates an embodiment according to the present teachings, and FIG. 5a shows a prior art solution for comparison.

An embodiment of an antenna structure 10 according to the present teachings is illustrated in FIG. 5b for a one-dimensional panel with four dual-polarized elements, but it is noted that the teachings may be applied for panels with any number of elements, and also for two dimensional panels. If digital precoding is applied over the respective baseband chains (BB) 11a, 11b; 5a, 5b the performance will be the same for the two cases (prior art case of FIG. 5a and the embodiment of FIG. 5b according to the present teachings). However, as often will be the case, when no precoding is applied over the different baseband chains 11a, 11b; 5a, 5b the embodiments according to the present teachings will give better performance. There are many different scenarios where there will be no precoding over the different baseband chains. One example is when one panel is used for beam searching, and one panel is used for serving a certain UE. Another example is when each panel is used to serve a different UE simultaneously, i.e. MU-MIMO.

The antenna structure 10 has a vertical element separation $d_v$ that is larger than what is conventionally used. A first baseband chain 11a is connected to a first and a second antenna element 12a, 12b for transmission of a first signal S1. A second baseband chain 11b is connected to a third and a fourth antenna element 13a, 13b for transmission of a second signal S2. The four antenna elements 12a, 12b, 13a, 13b are arranged in an interleaved manner in the antenna structure 10. In particular, every second antenna element is connected to the first baseband chain 11a, and the remaining antenna elements are connected to the second baseband chain 11b. The first and second signals use the same carrier signal (same frequency).

In the prior art solution, the two baseband chains 5a; 5b use antenna elements 6a, 6b; 7a, 7b separated in the vertical direction by a distance of λ/2, and they are not interleaved with each other, but instead gathered in respective groups.

FIG. 6b illustrates an embodiment according to the present teachings, and FIG. 6a shows a prior art solution for comparison.

FIG. 6b illustrates another embodiment of an antenna structure in accordance with the present teachings. The antenna structure 20 comprises a two-dimensional antenna panel wherein the antenna elements 21a, 21b, 21c, 21d, 21e, 21f of a first set are interleaved with antenna elements 22a, 22b, 22c, 22d, 22e, 22f of a second set in the vertical dimension in order to increase the vertical element separation $d_v$. However, the antenna elements are not interleaved in the horizontal dimension in order to keep an optimal horizontal antenna element separation $d_h$, preferably of about $0.5\lambda$, or at least less than $0.7\lambda$. The antenna elements 21a, 21b, 21c, 21d, 21e, 21f of the first set are connected to a first baseband chain 23a via a first analog distribution network 24a. Correspondingly, the antenna elements 22a, 22b, 22c, 22d, 22e, 22f of the second set are connected to a second baseband chain 23b via a second analog distribution network 24b. This new antenna design may be compared to the current antenna design shown in FIG. 6a comprising two different antenna panels 5a, 5b stacked next to each other and fed by a respective baseband chain. As has been described, the antenna structure 10, 20 according to the present teachings allow an increased antenna element separation in the vertical dimension without an increase of antenna aperture, and with an increase in the capacity in a communication system for a given antenna size.

The various features and embodiments that have been described may be combined in different ways, examples of which are given in the following.

An antenna structure 10, 20 for beamforming is provided. The antenna structure 10, 20 comprises a first set of antenna elements 12a, 12b; 21a, 21b, 21c, 21d, 21e, 21f connected by a first analog distribution network 14a; 24a to a first baseband chain 11a; 23a.

The antenna structure 10, 20 comprises a second set of antenna elements 13a, 13b; 22a, 22b, 22c, 22d, 22e, 22f connected by a second analog distribution network 14b; 24b to a second baseband chain 11b; 23b.

In the antenna structure 10, 20, the first set of antenna elements 12a, 12b; 21a, 21b, 21c, 21d, 21e, 21f are arranged interleaved with the second set of antenna elements 13a, 13b; 22a, 22b, 22c, 22d, 22e, 22f and all antenna elements (i.e. the antenna elements of the first and second sets) are designed for use on same carrier frequency.

The antenna structure 10, 20 may be a one-dimensional or two-dimensional antenna panel (i.e. a rectangular antenna array) and the antenna elements may, for instance, comprise dual-polarized elements.

The analog distribution network 14a, 24a, 14b, 24b may, for instance, comprise phase shifters for beam steering and amplifiers (as illustrated in FIG. 5b).

In various embodiments, the vertical distance, $d_v$, between two consecutive antenna elements 12a, 12b; 21a, 21b, 21c, 21d, 21e, 21f of the first set is larger than $0.5\lambda$ and/or the vertical distance, $d_v$, between two consecutive antenna elements 13a, 13b; 22a, 22b, 22c, 22d, 22e, 22f of the second set is larger than $0.5\lambda$.

In various embodiments, the vertical distance, $d_v$, between two consecutive antenna elements 12a, 12b; 21a, 21b, 21c, 21d, 21e, 21f of the first set and between two consecutive antenna elements 13a, 13b; 22a, 22b, 22c, 22d, 22e, 22f of the second set is at least $0.8\lambda$.

In various embodiments, the horizontal distance, $d_h$, between two consecutive antenna elements 12a, 12b; 21a, 21b, 21C, 21d, 21e, 21f of the first set and also between two consecutive antenna elements 13a, 13b; 22a, 22b, 22c, 22d, 22e, 22f of the second set is less than $0.7\lambda$.

In the antenna structure 10, 20 all antenna elements (i.e. the antenna elements of the first and second sets) are designed for use on same carrier frequency. In some embodiments, this is achieved by all the antenna elements 12a, 12b; 21a, 21b, 21c, 21d, 21e, 21f of the first set and the antenna elements 13a, 13b; 22a, 22b, 22c, 22d, 22e, 22f of the second set being dual-polarized elements.

In some embodiments, the antenna elements 12a, 12b; 21a, 21b, 21c, 21d, 21e, 21f of the first set and the antenna elements 13a, 13b; 22a, 22b, 22c, 22d, 22e, 22f of the second set are arranged in a two dimensional antenna panel. In other embodiments, the antenna elements 12a, 12b; 21a, 21b, 21c, 21d, 21e, 21f of the first set and the antenna elements 13a, 13b; 22a, 22b, 22c, 22d, 22e, 22f of the second set are arranged in a one dimensional antenna panel.

The antenna structure 10, 20 as has been described may be used for communication device 3 specific beamforming.

In an embodiment of such use, no precoding is applied simultaneously over the first and second baseband chains 11a, 11b; 23a, 23b for a (same) layer.

In an embodiment of such use, different signals are sent on the first and second sets of antenna elements. In other embodiments, the same signal may be sent on all antenna elements.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. An antenna structure for beamforming, the antenna structure comprising:
   at least two separate baseband chains, including a first baseband chain and a second baseband chain;
   a first set of antenna elements connected by a first analog distribution network to the first baseband chain; and
   a second set of antenna elements connected by a second analog distribution network to the second baseband chain that is separate from the first baseband chain, wherein
   the first set of antenna elements are arranged interleaved with the second set of antenna elements, and
   the antenna elements of the first and second sets are designed for use on same carrier frequency.

2. The antenna structure of claim 1, wherein the vertical distance, $d_v$, between two consecutive antenna elements of the first set is larger than $0.5\lambda$.

3. The antenna structure of claim 1, wherein the vertical distance, $d_v$, between two consecutive antenna elements of the second set is larger than $0.5\lambda$.

4. The antenna structure of claim 1, wherein the vertical distance, $d_v$, between two consecutive antenna elements of the first set and between two consecutive antenna elements of the second set is at least $0.8\lambda$.

5. The antenna structure as claimed in claim 4, wherein the horizontal distance, $d_h$, between two consecutive antenna elements of the first set and between two consecutive antenna elements of the second set is less than $0.7\lambda$.

6. The antenna structure of claim 1, wherein the antenna elements of the first set and the antenna elements of the second set comprises dual-polarized elements.

7. The antenna structure of claim 1, wherein the antenna elements of the first set and the antenna elements of the second set are arranged in a two dimensional antenna panel.

8. The antenna structure of claim 1, wherein the antenna elements of the first set and the antenna elements of the second set are arranged in a one dimensional antenna panel.

9. A method comprising:
   using the antenna structure of claim 1, for communication device specific beamforming.

10. The method of claim 9, wherein no precoding is applied simultaneously over the first and second baseband chains for a layer.

11. The method of claim 9, wherein different signals are sent on the first and second sets of antenna elements.

\* \* \* \* \*